US012081929B2

(12) United States Patent
Ozcan et al.

(10) Patent No.: US 12,081,929 B2
(45) Date of Patent: Sep. 3, 2024

(54) APPARATUS FOR SENSING COMPRISING A MICROPHONE ARRANGEMENT

(71) Applicant: Nokia Technologies Oy, Espoo (FI)

(72) Inventors: Koray Ozcan, Hampshire (GB); Miikka Vilermo, Siuro (FI); Antero Tossavainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/954,926

(22) PCT Filed: Dec. 21, 2018

(86) PCT No.: PCT/FI2018/050968
§ 371 (c)(1),
(2) Date: Jun. 17, 2020

(87) PCT Pub. No.: WO2019/129924
PCT Pub. Date: Jul. 4, 2019

(65) Prior Publication Data
US 2020/0396528 A1    Dec. 17, 2020

(30) Foreign Application Priority Data

Dec. 27, 2017    (GB) ..................... 1721974

(51) Int. Cl.
*H04R 1/04*    (2006.01)
*H04B 1/20*    (2006.01)
(Continued)

(52) U.S. Cl.
CPC ............... *H04R 1/04* (2013.01); *H04B 1/20* (2013.01); *H04R 5/027* (2013.01); *H04R 5/04* (2013.01)

(58) Field of Classification Search
CPC .. H04R 19/04; H04R 2201/003; H04R 31/00; H04R 1/04; H04R 5/027; H04R 5/04;
(Continued)

(56) References Cited

U.S. PATENT DOCUMENTS 7,995,777 B2    8/2011    Yu et al.
9,095,077 B2    7/2015    Bhardwaj
(Continued)

FOREIGN PATENT DOCUMENTS

CN    203968362 U    11/2014
CN    205160780 U    4/2016
(Continued)

OTHER PUBLICATIONS

Todorovic et al., "Multilayer graphene condenser microphone", 2D Materials, vol. 2, No. 4, Nov. 26, 2015, pp. 1-14.
(Continued)

*Primary Examiner* — Norman Yu
(74) *Attorney, Agent, or Firm* — Harrington & Smith

(57) ABSTRACT

An apparatus (1) and electronic device (23), the apparatus comprising: a microphone arrangement (3); and a sensing arrangement (5) comprising two dimensional material (17); wherein the microphone arrangement (3) is configured to transduce a sound signal into an audio output signal and the sensing arrangement (5) is configured to transduce a parameter into an electrical output signal.

19 Claims, 4 Drawing Sheets

(51) Int. Cl.
*H04R 5/027* (2006.01)
*H04R 5/04* (2006.01)

(58) Field of Classification Search
CPC .... H04R 29/004; H04R 17/02; H04R 19/016; H04R 2307/025; H04R 2410/00; H04R 9/08; H04R 19/00; H04R 2307/029; H04B 1/20
USPC .... 381/174, 113, 369, 191, 122, 56, 114, 58
See application file for complete search history.

(56) References Cited

U.S. PATENT DOCUMENTS

| | | | |
|---|---|---|---|
| 9,515,580 | B2 | 12/2016 | Pinkerton et al. |
| 9,706,294 | B2 | 7/2017 | Kopetz et al. |
| 2009/0257599 | A1 | 10/2009 | Sand Jensen et al. |
| 2013/0022207 | A1 | 1/2013 | Luo et al. |
| 2014/0053651 | A1* | 2/2014 | Besling ................ G01L 9/0016 73/702 |
| 2014/0113828 | A1 | 4/2014 | Gilbert et al. ................ 505/100 |
| 2014/0126730 | A1 | 5/2014 | Crawley et al. |
| 2014/0247954 | A1 | 9/2014 | Hall et al. |
| 2014/0270271 | A1* | 9/2014 | Dehe ...................... H04R 31/00 381/174 |
| 2015/0146875 | A1 | 5/2015 | Gautama |
| 2015/0256917 | A1 | 9/2015 | Schelling et al. |
| 2015/0264486 | A1 | 9/2015 | Yuan et al. |
| 2015/0381078 | A1 | 12/2015 | Massoner |
| 2016/0037245 | A1* | 2/2016 | Harrington .............. H04R 1/08 381/111 |
| 2016/0105746 | A1 | 4/2016 | Berthelsen et al. |
| 2016/0127833 | A1 | 5/2016 | Yasuda et al. |
| 2016/0165330 | A1 | 6/2016 | Minervini et al. |
| 2016/0212546 | A1 | 7/2016 | Salvatti |
| 2016/0221822 | A1 | 8/2016 | Krumbein et al. |
| 2016/0345114 | A1 | 11/2016 | Hanna et al. |
| 2017/0006394 | A1 | 1/2017 | Risberg et al. |
| 2017/0026760 | A1 | 1/2017 | Albers et al. |
| 2017/0094408 | A1 | 3/2017 | Napoli et al. |
| 2017/0155993 | A1 | 6/2017 | Boesen |
| 2017/0217765 | A1* | 8/2017 | Rajaraman .......... B81C 1/00206 |
| 2017/0245057 | A1* | 8/2017 | Grazian ................... H04R 9/06 |
| 2018/0103323 | A1* | 4/2018 | Kim ..................... H04R 31/003 |

FOREIGN PATENT DOCUMENTS

| | | |
|---|---|---|
| CN | 205179359 U | 4/2016 |
| CN | 205510389 U | 8/2016 |
| EP | 2700928 A1 | 2/2014 |
| EP | 2765759 A1 | 8/2014 |
| EP | 2806656 A1 | 11/2014 |
| JP | 2009200740 A | 9/2009 |
| WO | 2005/091672 A1 | 9/2005 |
| WO | 2011/142637 A2 | 11/2011 |
| WO | 2013/170378 A1 | 11/2013 |
| WO | 2014/114847 A1 | 7/2014 |

OTHER PUBLICATIONS

"20 things you can do with graphene", Physics World, Jun. 2012, 4 pages.

"9 Incredible Uses for Graphene", Gizmodo Retrieved on Jun. 2, 2020, Webpage available at : https://gizmodo.com/9-incredible-uses-for-graphene-5988977.

Chen et al., "Ultra-large Suspended Graphene as Highly Elastic Membrane for Capacitive Pressure Sensor", Nanoscale, vol. 8, 2016, pp. 3555-3564.

Klippel, "The power of Loudspeaker Models The power of Loudspeaker Model", AES 117th Convention, Oct. 28-31, 2004, 50 pages.

Bright et al., "Active control of loudspeakers: An investigation of practical applications", DTU Orbit, Nov. 2002, pp. 1-203.

"Vci-1 Voicecoil Temperature Sensor (Version 3.5)", Dioguardo Engineering, Retrieved on Jun. 5, 2020, Webpage available at: https://dioguardoengineering.com/products/vci-1-voicecoil-temperature-sensor-revision-2-5?variant=11346764486.

Heath et al., "Multi-frequency Sound Production and Mixing in Graphene", Scientific Reports, vol. 7, May 2, 2017, pp. 1-9.

"Ora Sound Producing Graphene Speaker Technology", Fudzilla, Retrieved on Jun. 3, 2020, Webpage available at : https://www.fudzilla.com/news/42691-ora-sound-producing-graphene-speaker-technologyresolution/.

Search Report received for corresponding United Kingdom Patent Application No. 1721972.6, dated Jun. 20, 2018, 4 pages.

Search Report received for corresponding United Kingdom Patent Application No. 1721974.2, dated Jun. 22, 2018, 4 pages.

International Search Report and Written Opinion received for corresponding Patent Cooperation Treaty Application No. PCT/FI2018/050888, dated Mar. 12, 2019, 16 pages.

International Search Report and Written Opinion received for corresponding Patent Cooperation Treaty Application No. PCT/FI2018/050968, dated Mar. 20, 2019, 14 pages.

Pandey, "Highly sensitive and selective chemiresistor gas/vapor sensors based on polyaniline nanocomposite: A comprehensive review", Journal of Science: Advanced Materials and Devices, vol. 1, 2016, pp. 431-453.

* cited by examiner

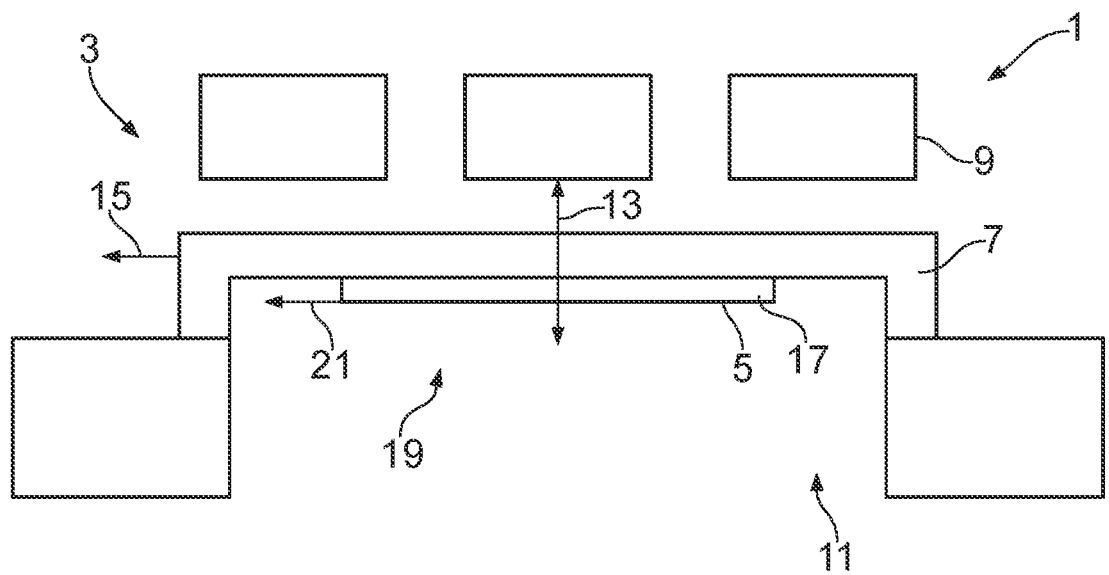
FIG. 1
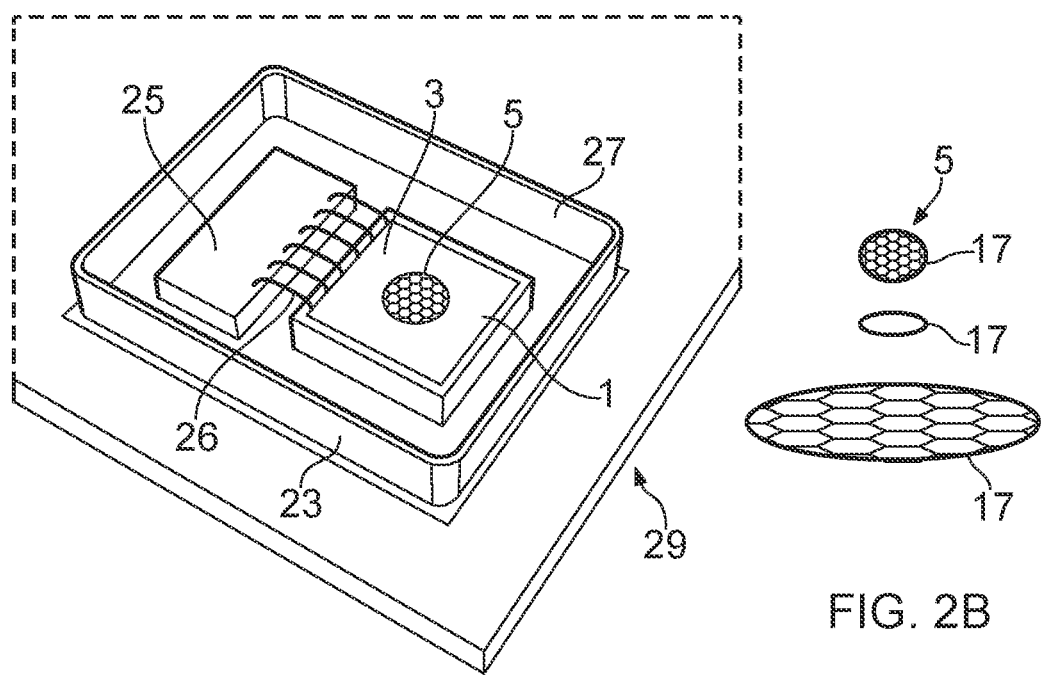
FIG. 2A
FIG. 2B

APPARATUS FOR SENSING COMPRISING A MICROPHONE ARRANGEMENT

RELATED APPLICATION

This application claims priority to PCT Application No. PCT/FI2018/050968, filed on Dec. 21, 2018, which claims priority to Great Britain Patent Application No. 1721974.2, filed on Dec. 27, 2017, each of which is incorporated herein by reference in its entirety.

TECHNOLOGICAL FIELD

Examples of the disclosure relate to an apparatus for sensing. In particular they relate to an apparatus for capturing sound and also sensing one or more other parameters.

BACKGROUND

Apparatus, such as microphones, for capturing sound are known. It can be useful to enable such apparatus to obtain additional information about the environment in which the apparatus is located.

BRIEF SUMMARY

According to various, but not necessarily all, examples of the disclosure there is provided an apparatus comprising: a microphone arrangement; and a sensing arrangement comprising two dimensional material; wherein the microphone arrangement is configured to transduce a sound signal into an audio output signal and the sensing arrangement is configured to transduce a parameter into an electrical output signal.

The microphone arrangement may comprise a membrane and the two dimensional material of the sensing arrangement may comprise part of the membrane.

The microphone arrangement may comprise a first membrane configured to transduce an incident sound wave into an audio electrical output signal and the two dimensional material of the sensing arrangement may comprise a second membrane.

The microphone arrangement may comprise a back plate and the two dimensional material of the sensing arrangement may comprise part of the back plate.

The apparatus may comprise a first output configured to provide the audio output signal and a second output configured to provide the electrical output signal.

The apparatus may be configured to provide the audio output signal independently of the electrical output signal.

The audio output signal and the electrical output signal may be provided at the same time.

The audio output signal may provide an indication of a change in capacitance between the membrane and a conductive plate of the apparatus and the electrical output signal provides an indication of a change in conductivity of the two dimensional material in response to the incident parameter.

The apparatus may also comprise a first terminal configured to provide the audio output signal and a second terminal configured to provide the electrical output signal.

The apparatus may also comprise a terminal configured to provide both the audio output signal and the electrical output signal.

The apparatus may also comprise an input configured to provide a direct current bias voltage to the membrane. The apparatus may also comprise a gate electrode coupled to the layer of two dimensional material where the gate electrode is configured to be driven by the bias voltage.

The apparatus may also comprise an input configured to provide an alternating current signal to the two dimensional material. The frequency of the alternating current signal may be above audible frequency range. The alternating current signal may provide a carrier signal.

The two dimensional material may comprise a conductive material.

The two dimensional material may comprise at least one of: graphene, graphene oxide, reduced graphene oxide, functionalized graphene, molybdenum disulphide, tungsten disulphide, boron nitride.

The parameter may comprise at least one of; temperature, humidity, light, analytes.

According to various, but not necessarily all, examples of the disclosure there is provided an apparatus comprising: a microphone arrangement; and sensing means comprising two dimensional material; wherein the microphone arrangement is configured to transduce a sound signal into an audio output signal and the sensing means is configured to transduce a parameter into an electrical output signal.

According to various, but not necessarily all, examples of the disclosure there is provided an electronic device comprising an apparatus as described above and electronic circuitry configured to process the audio output signal and the electrical output signal.

The electronic circuitry may be provided within the microphone arrangement.

The electronic circuitry may be provided outside of the microphone arrangement.

The electronic device may comprise a plurality of apparatus and one or more electronic circuitries configured to process the audio output signal and electrical output signal from the plurality of apparatus. The one or more electronic circuitries may be configured to use the processed audio output signal and the electrical output signal to adaptively adjust one or more specifications of at least one of the plurality of apparatus.

According to various, but not necessarily all, examples of the disclosure there is provided examples as claimed in the appended claims.

BRIEF DESCRIPTION

For a better understanding of various examples that are useful for understanding the detailed description, reference will now be made by way of example only to the accompanying drawings in which:

FIG. 1 illustrates an example apparatus;

FIGS. 2A to 2B illustrate an electronic device comprising an example apparatus;

DETAILED DESCRIPTION

Figure 3:
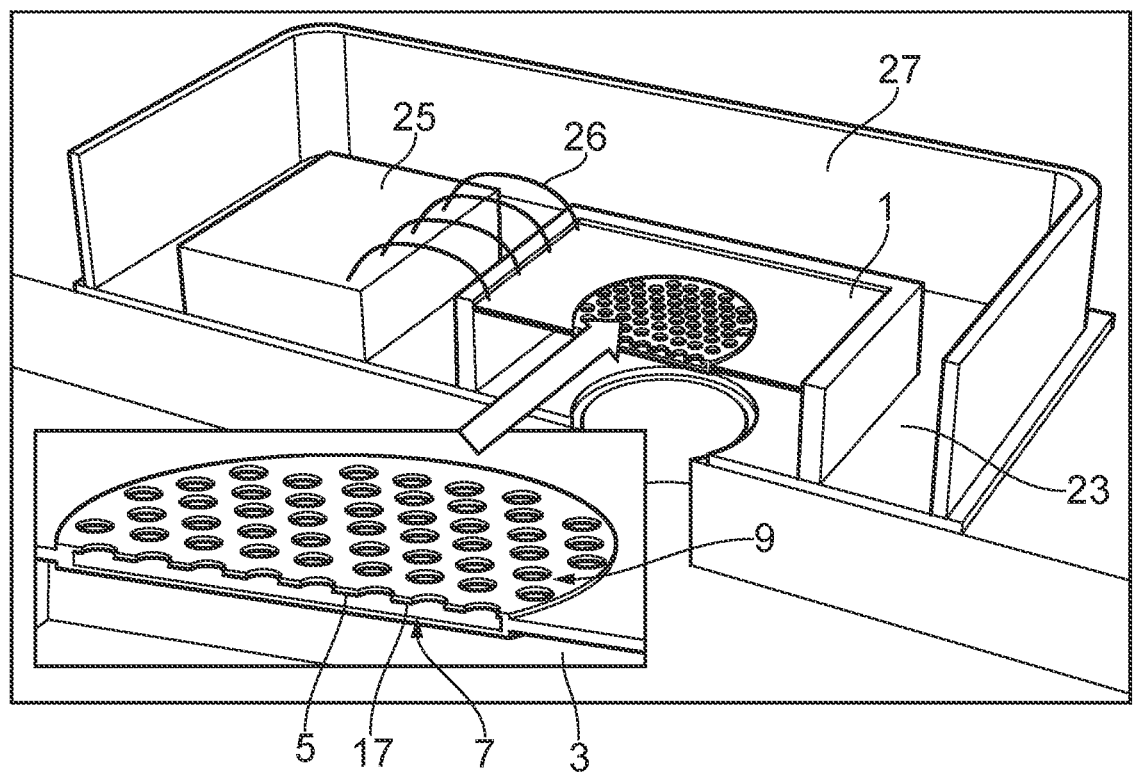
FIG. 3 illustrates an electronic device comprising another example apparatus.

Examples of the disclosure relate to an apparatus 1 for sensing. The apparatus comprises a microphone arrangement 3 which is configured to sense sound signals. The apparatus 1 also comprises an additional sensing arrangement 5. The additional sensing arrangement 5 comprises one or more layers of two dimensional material 17 and is configured to sense a parameter 19 other than sound signals. The additional sensing arrangement 5 may enable information about the environment of the apparatus 1 to be obtained. This information may be useful as the environmental conditions may affect the functioning or performance of the microphone arrangement 3.

FIG. 1 schematically illustrates an apparatus 1 according to examples of the disclosure. The example apparatus 1 comprises a microphone arrangement 3 and a sensing arrangement 5.

The microphone arrangement 3 may comprise any means which may be configured to transduce an incident sound signal into an audio output signal. The audio output signal may be an electrical signal. The microphone arrangement 3 may comprise a MEMS (microelectro-mechanical systems) microphone, an electret condenser microphone or any other suitable type of microphone.

In the example of FIG. 1 the microphone arrangement 3 comprises a membrane 7, a back plate 9 and a cavity 11.

The back plate 9 comprises a stiff structure. The back plate 9 comprises a plurality of perforations which allow air to pass through so that the back plate 9 does not move when a sound signal is incident on the microphone arrangement 3. The back plate 9 may comprise any suitable material. The back plate 9 may comprise a conductive material.

The membrane 7 comprises a flexible layer which extends over the cavity 11. The membrane 7 is positioned between the cavity 11 and the back plate 9. The membrane 7 may comprise a conductive material so that the membrane 7 and the back plate 9 form a capacitor.

The membrane 7 is thin relative to the back plate 9. The membrane 7 is flexible so that the membrane 7 moves when a sound signal is incident on the microphone arrangement 3.

When a sound signal is incident on the microphone arrangement 3 the membrane 7 moves in the directions as indicated by the arrows 13. This movement causes the membrane to oscillate towards and away from the back plate 9. This changes the capacitance between the membrane 7 and the back plate 9. This change in capacitance provides an audio output signal 15 which is indicative of the incident sound signal. The audio output signal 15 may be provided to electronic circuitry 25 which may be configured to process the audio output signal 15.

The apparatus 1 also comprises a sensing arrangement 5. In the example of FIG. 1 the sensing arrangement 5 is provided within the microphone arrangement 3.

The sensing arrangement 5 comprises two dimensional material 17. The sensing arrangement 5 may comprise one or more layers of two dimensional material 17. In the example of FIG. 1 the sensing arrangement 5 comprises a layer of two dimensional material 17 provided on the membrane 7. It is to be appreciated that the two dimensional material 17 may be provided in any suitable position within the apparatus 1. For instance the two dimensional material 17 could be provided on the back plate 9 or as an additional membrane 7.

The two dimensional material 17 may comprise any suitable material which provides a measureable electrical output signal in response to an incident parameter 19. In some examples the two dimensional material 17 may comprise a conductive material which may change conductivity in response to the incident parameter 19.

The two dimensional material 17 may be configured within the apparatus 1 so as to enable changes in the electrical properties of the two dimensional material 17 to be detected. In some examples the two dimensional material 17 may be provided as a channel in a transistor such as a field effect transistor. In such examples the two dimensional material 17 may be provided between a source electrode and drain electrode so as to enable the conductivity of the two dimensional material 17 to be measured. In some examples a gate electrode may be electrically coupled to the two dimensional material 17 so as to improve the sensitivity of the field effect transistor.

The two dimensional material 17 may comprise a very thin layer of material. In some examples the two dimensional material 17 could be an atomic monolayer. In some examples the two dimensional material 17 could comprise several atomic monolayers. The two dimensional material 17 may be thin relative to the membrane 7. In some examples the two dimensional material 17 may be several orders of magnitude thinner than the membrane 7.

In some examples the two dimensional material 17 may comprise a material which is strong enough so that it can be deformed and/or subjected to strain. For example, where the two dimensional material 17 is provided on a membrane 7 the two dimensional material may move and flex during the detection of the sound signal. In such cases the two dimensional material 17 must be strong enough such that deformation of the membrane 7 does not cause failure or other damage to the two dimensional material 17.

In some examples the two dimensional material 17 could comprise graphene. In some examples the two dimensional material 17 could comprise a graphene based material such as graphene oxide or reduced graphene oxide. In some examples the two dimensional material 17 could comprise molybdenum disulphide, tungsten disulphide, boron nitride or any other suitable material or combinations of these materials.

In some examples the two dimensional material 17 may comprise functionalized graphene. The graphene could be functionalized using colloidal quantum dots, metallic nanoparticles, bio-functional molecules or any other suitable means. The means that is used to functionalize the graphene may depend on the parameter and/or parameters 19 that the sensing arrangement 5 is intended to sense.

In some examples the two dimensional material 17 could be configured into a three dimensional structure. For example, graphene may be configured into carbon nanotubes or other suitable structures. In some examples the two dimensional material 17 could be integrated into a three dimensional structure. For example a three dimensional structure could be coated with the two dimensional material 17 or may have the two dimensional material 17 provided within the three dimensional structure.

The parameter 19 that is to be sensed by the two dimensional material 17 may comprise any suitable parameter. The parameter 19 may comprise any conditions within the environment of the apparatus 1. In some examples the parameter 19 may comprise any measurable conditions which may affect the performance or functioning of the microphone arrangement 3. For example the parameter 19 could comprise at least one of temperature, humidity, light, analytes and/or a combination of any of these. The analytes could comprise a particular chemical or chemical species.

The parameter 19 causes a change in conductivity of the two dimensional material 17 which causes an electrical output signal 21 to be provided. The electrical output signal 21 provides an indication of the parameter 19. The electrical output signal 21 may provide an indication of the type of parameter 19 and/or the quantity of the parameter 19. The electrical output signal 21 may be provided to electronic circuitry 25 to enable the electronic circuitry 25 to process and/or store the electrical output signal 21.

In some examples of the disclosure the electrical output signal 21 is provided independently of the audio output signal 15. The audio output signal 15 may be independent of the electrical output signal 21 so that the audio output signal 15 can be provided without affecting the electrical output signal 21. The audio output signal 15 and the electrical output signal, 21 may be provided at the same time and/or at different times. This enables the apparatus 1 to detect both sound signals and other types of parameters 19.

In some examples the change in conductivity of the two dimensional material 17 may be a permanent change in conductivity and/or may last even when the parameter 19 is removed. This enables information about the environment that the two dimensional material 17 has been exposed to be stored in the two dimensional material 17. This may enable historical information about the environments that the apparatus 1 has been exposed to be obtained.

FIG. 2A illustrates part of an electronic device 23 comprising an example apparatus 1 and electronic circuitry 25. The part of the electronic device 23 shown in FIG. 2A may be an internal part which could, in use, be provided within a casing or other type of housing. The example apparatus 1 comprises a microphone arrangement 3 and a sensing arrangement 5 which may be as described above. It is to be appreciated that the electronic device 23 may comprise additional components that are not shown in FIG. 2A.

FIG. 2B illustrates example two dimensional material 17 that could be used in the apparatus 1 within the electronic device 23. In the example apparatus of FIGS. 2A to 2B the two dimensional material 17 of the sensing arrangement 5 comprises part of the membrane 7. The two dimensional material 17 may be provided overlaying a part of the membrane 7. In such examples the membrane 7 may comprise at least two different materials. As the two dimensional material 17 is very thin the extra mass of the two dimensional material 17 does not restrict the movement of the membrane 7 and still allows the membrane 7 to move in response to the incident sound signal.

FIG. 2B shows several views of the two dimensional material 17 that could be used in some examples of the disclosure. In the example of FIG. 2B the two dimensional material 17 comprises graphene or a graphene based material. The two dimensional material 17 is provided in a disc shape. Other shapes of the two dimensional material 17 may be used in other examples of the disclosure, for example a non-symmetric shape such as a square shape or a rectangular shape could be used.

In the example of FIG. 2A the apparatus 1 also comprises a plurality of electrical connections 26. The electrical connections 26 provide a plurality of output terminals and a plurality of input terminals. At least one output terminal is configured to provide the audio output signal 15 and at least one output terminal is configured to provide the electrical output signal 21. In some examples a first output terminal may be configured to provide the audio output signal 15 and a second output terminal may be configured to provide the electrical output signal 21. In other examples the same output terminal may be configured to provide both the audio output signal 15 and the electrical output signal 21. The output terminals may be configured to provide the output signals 15, 21 to the electronic circuitry 25.

The inputs may be configured to enable one or more control signals to be provided to the apparatus 1. The control signals may be provided from the electronic circuitry 25 to the apparatus 1.

In some examples at least one input may be configured to provide an alternating current signal to the two dimensional material 17. For example the alternating current may be provided to a source electrode of a transistor comprising the two dimensional material 17. The frequency of the alternating current signal may be above the audible frequency range so as to reduce interference with the audio output signal 15 provided by the microphone arrangement 3. The alternating current signal may provide a carrier signal for the output signals 15, 21.

In some examples at least one input may be configured to provide a direct current bias voltage to the membrane 7. The input may also be configured to provide the DC bias voltage to a gate electrode where the gate electrode is electrically coupled to the two dimensional material 17.

The electronic circuitry 25 may comprise any means which may be configured to provide one or more input signals to the apparatus 1 and/or receive one or more output signals 15, 21 from the apparatus 1. The electronic circuitry 25 may be configured to process the audio output signal 15 and/or the electrical output signal 21. The electronic circuitry 25 may comprise an integrated circuit such as an ASIC (application specific integrated circuit) or any other suitable type of circuitry.

In some examples the electronic circuitry 25 may comprise memory circuitry. The memory circuitry may be configured to store output signals 15, 21 and/or information obtained from the output signals 15, 21. For instance in some examples the sensing arrangement 5 may detect the parameter 19 at a first time and the microphone arrangement 3 may detect the sound signal at a second different time. The second time may be later than the first time. Information obtained from the electrical output signal 21 may be stored in the memory circuitry and may be used to process the audio output signal 15. In some examples the electronic circuitry 25 may be configured to enable the information to be stored in an external device.

The part of the electronic device 23 shown in FIG. 2A comprises a housing 27. The housing 27 may provide a protective casing around the microphone arrangement 3 and the electronic circuitry 25. This enables the electronic circuitry 25 to be provided within the microphone arrangement 3. In other examples the housing 27 may be provided around the microphone arrangement 3 and the electronic circuitry 25 may be provided outside of the housing 27. This enables the electronic circuitry 25 to be provided outside of the microphone arrangement 3. The audio output signal 15 and the electrical output signal 21 may be processed the same way whether the electronic circuitry 25 is provided inside or outside of the housing.

In the example of FIG. 2A only one apparatus 1 and electronic circuitry 25 are shown within the electronic device 23. It is to be appreciated that in other examples the electronic device 23 could comprise a plurality of apparatus 1 each comprising a microphone arrangement 3 and a sensing arrangement 5. For example, where the electronic device 23 is a mobile telephone or other communications device the mobile telephone could comprise a plurality of different apparatus 1 located at different positions within the mobile telephone. This may enable a plurality of microphone arrangements 3 and sensing arrangements 5 to be provided within a single electronic device 23.

In the example of FIG. 2A only one electronic circuitry 25 is shown coupled to the single apparatus 1. In other examples, where the electronic device 23 comprises a plurality of apparatus 1 the electronic circuitry 25 may be coupled to the plurality of apparatus 1 and configured to process the audio output signals 15 and the electrical output signals 21 from each of the apparatus 1. In some examples a single electronic circuitry 25 could be provided and may be coupled to a plurality of different apparatus 1. In other examples a plurality of electronic circuitries 25 may be provided within a single electronic device 23. Different electronic circuitries 25 may be coupled to different apparatus 1.

The one or more electronic circuitries 25 may be configured to use the processed audio output signal and the electrical output signal to adaptively adjust one or more specifications of at least one of the plurality of apparatus 1. For example the one or more electronic circuitries 25 can adjust the sensitivity of one or more of the apparatus 1. This may be useful if different apparatus 1 are operating in different conditions or if they have different sensitivities as it enables the specifications of the apparatus 1 to be adjusted to provide consistent outputs.

The housing 27, the apparatus 1 and the electronic circuitry 25 may be mounted on a circuit board 29. The part of the electronic device 23 as shown in FIG. 2A may be part of a communication device or any other suitable audio capture device.

FIG. 3 illustrates part of an electronic device 23 according to another example of the disclosure. In the example of FIG. 3 the part of the electronic device 23 comprises an apparatus 1 and electronic circuitry provided within a housing 27. The apparatus 1 comprises a microphone arrangement 3 and a sensing arrangement 5. In the apparatus 1 shown in FIG. 3 the sensing arrangement 5 is provided in a different arrangement compared to previously described examples.

In the example apparatus 1 of FIG. 3 the two dimensional material 17 comprises part of the back plate 9. In some examples the two dimensional material 17 may comprise a coating over the back plate 9 or at least part of the back plate 9. This may enable an additional sensing arrangement 5 to be provided within the apparatus 1 without significantly increasing the size or mass of the apparatus 1.

Figure 4A:
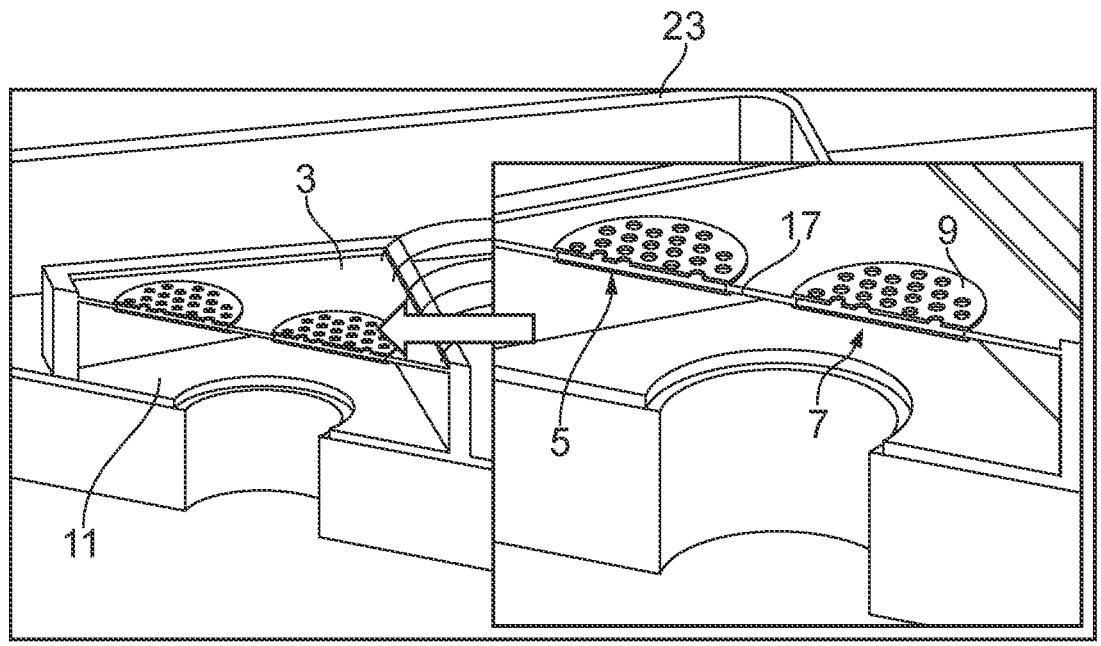
FIGS. 4A and 4B illustrate an electronic device comprising another example apparatus.
Figure 4B:
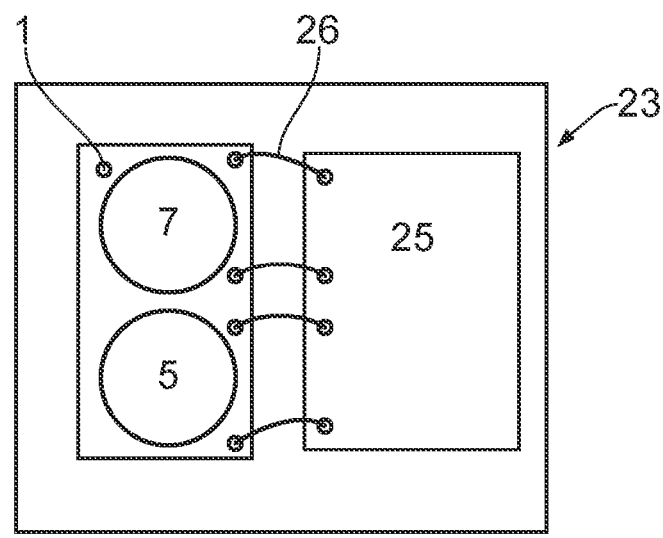

FIGS. 4A and 4B illustrates part of another electronic device 23 according to another example of the disclosure. In the example of FIGS. 4A and 4B the part of the electronic device 23 comprises an apparatus 1 and electronic circuitry provided within a housing 27. The apparatus 1 comprises a microphone arrangement 3 and a sensing arrangement 5. FIG. 4A shows a cross section through the part of the electronic device 23 and FIG. 4B schematically shows a plan view of the part of the electronic device 23. In the apparatus 1 shown in FIGS. 4A and 4B the sensing arrangement 5 is provided in a different arrangement compared to previously described examples.

In the example of FIGS. 4A and 4B the microphone arrangement 3 comprises a first membrane 7 configured to transduce an incident sound signal into an audio output signal 15 and the two dimensional material 17 comprises a second membrane 41 which is configured to provide the electrical output signal 21.

In the example of FIGS. 4A and 4B the two dimensional material 17 is provided adjacent to the membrane 7. In the example of FIGS. 4A and 4B the two dimensional 17 is provided so that there is no overlap between the two dimensional material 17 and the membrane 7 and/or the back plate 9 of the microphone arrangement 3.

It is to be appreciated that other arrangements of the sensing arrangement 5 within the apparatus 1 may be used in other examples of the disclosure.

Figure 5:
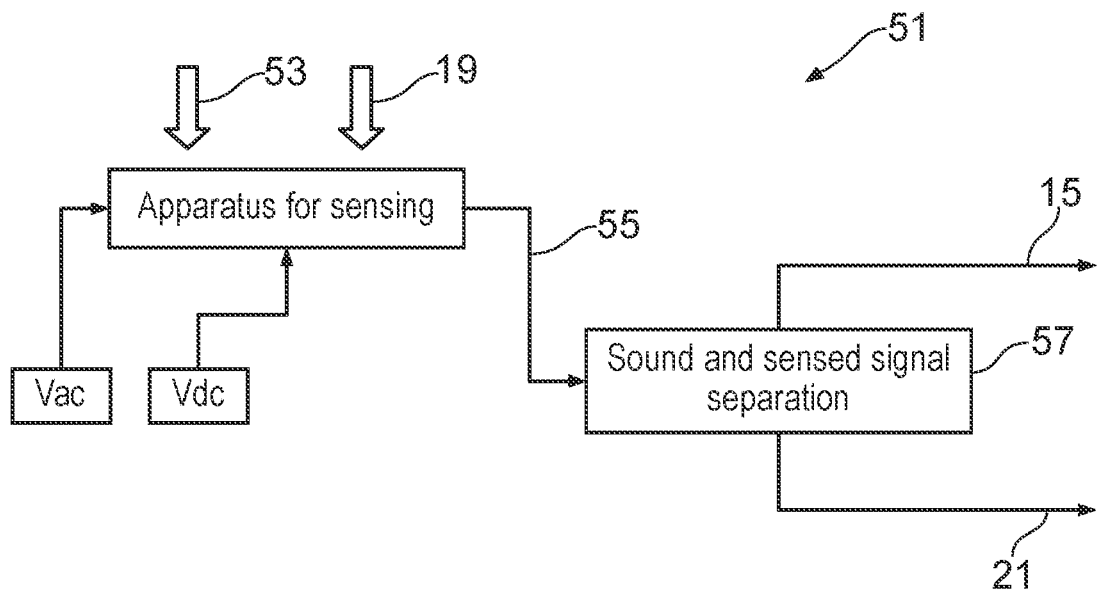
FIG. 5 illustrates an example circuit that may be used in examples of the disclosure.

FIG. 5 schematically illustrates an example circuit 51 that may be used in examples of the disclosure to enable the audio output signal 15 and the electrical output signal 21 to be obtained from the apparatus 1. The circuit 51 may be provided as part of the electronic circuitry 25.

In the example of FIG. 5 the apparatus 1 is biased by a direct current voltage $V_{dc}$. The direct current voltage $V_{dc}$ may be a large voltage. The direct current voltage $V_{dc}$ may be of the order of 50V. Other voltages may be used in other examples of the disclosure.

In some examples the direct current voltage $V_{dc}$ may be used to gate the sensing arrangement 5 within the apparatus 1. In such examples the direct current voltage $V_{dc}$ may be provided to a gate electrode of a field effect transistor comprising the two dimensional material 17.

An alternating current voltage $V_{ac}$ is provided as a carrier signal. The alternating current voltage $V_{ac}$ may enable the variable resistance of the sensing arrangement 5 within the apparatus 1 to be measured. The alternating current voltage $V_{ac}$ may have any suitable frequency. In some examples the alternating current voltage $V_{ac}$ may have a frequency which is higher than the audible frequency range. For example the alternating current voltage $V_{ac}$ may have a frequency which is above 20 kHz.

A sound signal 53 and a parameter 19 are detected by the apparatus 1. As mentioned above the parameter 19 may be a parameter such as temperature, humidity or any other suitable parameter. The sound signal 53 is transduced into an electrical output signal by the microphone arrangement 3. The parameter 19 is transduced into an electrical output signal by the sensing arrangement 5. The output signal 55 provided by the apparatus 1 comprises information indicative of both the parameter 19 and the sound signal 53.

The output signal 55 from the apparatus 1 may be provided to separation circuitry 57. The separation circuitry 57 may comprise any means which may be configured to separate the output from the microphone arrangement 3 from the output from the sensing arrangement 5. The separation circuitry 57 provides the audio output signal 15 as a first output and the electrical output signal 21 indicative of the sensed parameter 19 as the second output.

Figure 6:
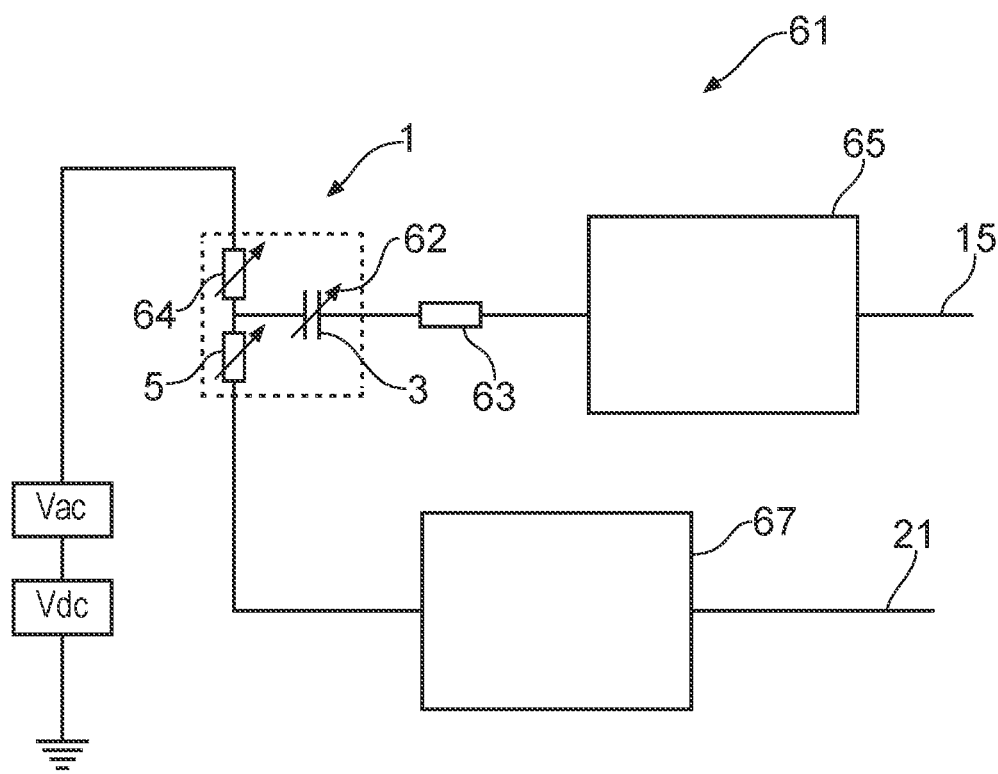
FIG. 6 illustrates another example circuit that may be used in examples of the disclosure.

FIG. 6 schematically illustrates another example circuit 61 that may be used in examples of the disclosure to enable the audio output signal 15 and the electrical output signal 21 to be obtained from the apparatus 1. The equivalent circuit for the apparatus 1 may be represented by the circuit shown inside the dashed lines. The apparatus 1 may be represented by the circuit shown inside the dashed lines if the time constant RC for the apparatus 1 is faster than the measurement frequencies. For example, if the microphone arrangement 3 has a capacitance between 10 and 100 pF and the sensing arrangement 5 provides a resistance of the order of 1 kOhm then the time constant RC for the apparatus 1 will be fast enough for the representation shown in the dashed lines to apply.

The circuit inside the dashed lines comprises a variable capacitor 62 and variable resistors 64. The signals from the variable capacitor 62 change based on the movement of the membrane 7 and the signals from the variable resistors change based on the parameter sensed by the sensing arrangement 5. The circuit 61 is configured to enable the signals from the variable capacitor 62 to be separated from the signals from the variable resistor 64. The circuit 61 therefore enables the change in capacitance caused by the movement of the membrane 7 and the change in conductivity of the two dimensional material 17 caused by the parameter 19 to be separated into two independent output signals 15, 21. It is to be appreciated that the circuit shown in FIG. 6 is only one example of a large number of possible examples that could be used.

In the example of FIG. 6 the microphone arrangement 3 is biased by a direct current voltage $V_{dc}$ and an alternating current voltage $V_{ac}$ is provided as a carrier signal. The direct current voltage $V_{dc}$ and the alternating current voltage $V_{ac}$ may be as described above.

The circuit 61 is configured to provide an impedance to the apparatus 1 so that the charge on the variable capacitor 62 provided by the microphone arrangement 3 remains almost constant. In the example of FIG. 6 the impedance is provided by the resistor 63. In the example of FIG. 6 the resistor 63 is shown as a single component. It is to be appreciated that in other examples the impedance could be provided by a plurality of components which could be configured in any suitable arrangement.

A first filter 65 is provided within the circuit 61 to remove low frequencies from the output of the variable capacitor. This filter 65 may be configured to remove unwanted excitations caused by the alternating current voltage $V_{ac}$ so as to provide an audio output signal 15 which is indicative of the sensed sound signal. This filter 65 may comprise any suitable components configured in any suitable configuration. In some examples the filter 65 could comprise a Bessel filter. It is to be appreciated that alternative and higher order filters may be used in other examples. The alternative filters may be configured to further reduce interference within the audio output signal 15.

The output of the sensing arrangement 5 is provided to a second filter 67 to enable an electrical output signal 21 indicative of the sensed parameter 19 to be provided. The second filter 67 may comprise circuitry configured to provide an output an alternating current signal with an amplitude that is proportional to the resistance of the sensing arrangement 5. In some examples the amplitude of the output signal could be given by $$\frac{Amp \times R_x}{R_x + R}$$

where Amp is the amplitude of the excitation signal, $R_x$ is the value the resistance between the sensing arrangement 5 and ground and R represents the variable resistance of the sensing arrangement 5.

The filter 67 may comprise any suitable components configured in any suitable configuration. In some examples the filter 67 may comprise a half wave rectifier and an integrator. In such examples the signal from the sensing arrangement 5 may be grounded by a resistor and capacitor in series. It is to be appreciated that any other suitable components or combinations of components could be used in examples of the disclosure.

In examples where the filter 67 comprises a half wave rectifier and an integrator the output of the variable resistor 64 may be coupled to a resistor to provide a potential divider. This provides an alternating current signal where the amplitude is proportional to the resistance of the variable resistor 64.

In the examples described above the apparatus 1 comprises a single sensing arrangement 5. In other examples the apparatus 1 could comprise a plurality of different sensing arrangements 5 each comprising one or more layers of two dimensional material 17. In some examples the different sensing arrangements 5 may be configured to detect different parameters 19. For example, a first sensing arrangement 5 could be configured to detect temperature changes and a second sensing arrangement 5 could be configured to detect humidity or analytes. In some examples the different sensing arrangements 5 could be configured to detect the same parameter 19 but in different positions within the apparatus 1 or microphone arrangement 3. In some examples the different sensing arrangements 5 could be configured to detect the same parameter 19 but may be arrange to have different sensitivities, this may enable a parameter 19 to be quantized. For example a humidity level above a first threshold could trigger a first sensing arrangement 5 but not a second sensing arrangement 5 while a humidity level above a second threshold could trigger both the first and second sensing arrangements 5.

In some of the examples described above the two dimensional material 17 is provided as overlaying a part of the membrane 7. In other examples the two dimensional material 17 may form the membrane 7 or at least part of the membrane 7. In such examples the movement of the two dimensional material 17 enables a sound signals to be detected and a change in the conductivity, or other electronic property, of the two dimensional material 17 enables the parameter 19 to be detected.

The use of the two dimensional material 17 enables a very small sensing arrangement 5 to be provided. The sensing arrangement 5 may be very small compared to the size of other components of the microphone arrangement 3. For examples, the thickness of the two dimensional material 17 may be orders of magnitude smaller than the thickness of the membrane 7 and/or the back plate 9. This may enable the sensing arrangement 5 to be added to the microphone arrangement 3 without significantly increasing the size and/or mass of the microphone arrangement 3.

The addition of the sensing arrangement 5 to the microphone arrangement 3 may be used to monitor the sensitivity of the microphone arrangement 3. As an example a communications device or other audio capture device may comprise a plurality of apparatus 1 comprising a microphone arrangement 3 and one or more sensing arrangements 5. Different microphone arrangements 3 within the same audio capture device may be exposed to different environmental conditions which may affect the performance of the microphone arrangements 3. For example, a microphone arrangement 3 that is positioned close to a battery or circuitry components, such as integrated circuits, may be exposed to higher temperatures than other microphone arrangements 3. In some examples the microphone arrangement 3 could be at risk of overheating if the ambient temperature gets too hot, for example, if the electronic device 23 comprising the apparatus 3 is left in direct sunlight or if the electronic device 23 comprising the apparatus 3 is being used in a very hot environment. Examples of the disclosure enable the temperatures of the different microphone arrangements 3 to be measured as the sound signal is being detected. The processing circuitry 25 can then use these temperature measurements to compensate for the different sensitivity levels of the different microphone arrangements 3.

In some examples the sensing arrangement 5 could be configured to detect parameters 19 that the microphone arrangement 3 could be exposed to which may affect the sensitivity of the microphone arrangement 3. For instance, if the microphone arrangement 3 is exposed to excessive temperatures or humidity levels this could cause damage to components of the microphone arrangement 3 which may affect the sensitivity. The sensing arrangement 5 may detect if the microphone arrangement 3 has been exposed to any such conditions. The sensing arrangement 5 may detect if the microphone arrangement 3 has been exposed to any such conditions at any time. For example, the sensing arrangement 5 could detect if the microphone arrangement 3 has been exposed to these conditions during manufacture. For instance soldering processes or reflow or washing process that are used during manufacture and assembly of the device may affect the acoustic performance of the microphone arrangement 3. The sensing arrangement 5 could also be used to monitor the environmental conditions that the microphone arrangement 3 is exposed to during use. For instance if the device is exposed to excessive temperatures, water or other analytes this could be detected and accounted for.

In examples where a plurality of different apparatus 1 are provided in a single electronic device 23 this may enable any changes in sensitivities of the microphone arrangements 3 to be monitored in real time. The examples of the disclosure ensure that the temperatures of the different microphone arrangements 3 comprised within the different apparatus 1 can be monitored to enable the sensitivities of the different microphone arrangements 3 that are being used to be matched. This monitoring can then be used to adjust the specifications of one or more of the microphone arrangements 3 or other parts of the apparatus 1. This may provide for improved performance of the electronic device 23 when performing functions such as noise cancellations, beam forming or any other functions which require the use of multiple microphone arrangements 3. This may enable adjustments to be made adaptively where some microphone arrangements 3 be more affected by temperature changes than other microphone arrangements 3.

In some examples the sensing arrangement 5 could be configured to detect parameters that are not directly related to the functioning of the microphone arrangement 3 and/or which are related to the functioning of other components within an electronic device 23. For instance, in some examples the sensing arrangement 5 could be used to detect visible light or other types of electromagnetic radiation. This may be useful in examples where the apparatus 1 is provided within an imaging device. This may enable the light levels to be determined independently of the imaging device.

In some examples information indicative of the detected parameter 19 may be provided to a user of the apparatus 1 and/or electronic device. For example, the sensing arrangement 5 could be configured to detect temperature and/or humidity or any other suitable parameter 19 that may be of interest to a user of the electronic device 23. In such examples the electrical output signal 21 from the sensing arrangement 5 could be processed and provided to an output device to enable information indicative of the sensed parameter to be provided to a user. In other examples the electrical output signal 21 from the sensing arrangement 5 could be provided to other components of the electronic device 23 and may be used by the other components to control the operation of other components of the electronic device 23. In such examples the sensing arrangement 5 may provide additional sensing capability within the electronic device 23 without increasing the number of components within the electronic device 21 because the sensing arrangement 5 is integrated with the microphone arrangement 3.

In this description the term coupled means operatively coupled. It is to be appreciated that there may comprise any number of components between coupled components including zero components.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising a microphone arrangement, the microphone arrangement comprising: a microphone membrane configured to sense sound signals; and a sensing arrangement positioned within a perimeter of the microphone arrangement and comprising one of a two dimensional material or a three dimensional material configured to sense a parameter; wherein the apparatus is configured to transduce the sensed sound signals into an audio output signal based on the microphone membrane and is further configured to transduce the parameter into an electrical output signal based on the sensing arrangement; and wherein the apparatus is configured to output the audio output signal and the electrical output signal; wherein the sensing arrangement overlays at least a portion of the microphone membrane.

2. The apparatus as claimed in claim 1, wherein the two dimensional material or the three dimensional material comprises a part of the microphone membrane.

3. The apparatus as claimed in claim 1, wherein the two dimensional material or the three dimensional material comprises a second membrane.

4. The apparatus as claimed in claim 1, wherein the microphone arrangement further comprises a back plate and two dimensional material or three dimensional material comprises a part of the back plate.

5. The apparatus as claimed in claim 1, wherein the apparatus further comprises a first output configured to provide the audio output signal and a second output configured to provide the electrical output signal.

6. The apparatus as claimed in claim 1, wherein the apparatus is configured to provide one of: the audio output signal independently of the electrical output signal; and the audio output signal and the electrical output signal are provided at the same time or substantially the same time.

7. The apparatus as claimed in claim 1, wherein the audio output signal provides an indication of a change in capacitance between the microphone membrane and a conductive plate of the apparatus and the electrical output signal provides an indication of a change in conductivity of the two dimensional material or the three dimensional material in response to an incident parameter.

8. The apparatus as claimed in claim 1 further comprising one of: a first terminal configured to provide the audio output signal and a second terminal configured to provide the electrical output signal; and a terminal configured to provide both the audio output signal and the electrical output signal.

9. The apparatus as claimed in claim 1 further comprising at least one of: an input configured to enable a bias voltage to be provided to the microphone membrane;
and an input configured to enable an alternating current signal to be provided to the two dimensional material or the three dimensional material.

10. The apparatus as claimed in claim 9 further comprising at least one of: a gate electrode coupled to the layer of the two dimensional material or the three dimensional material where the gate electrode is configured to be driven by the bias voltage, in an instance the input is configured to provide the bias voltage; and the frequency of the alternating current signal is above audible frequency range in an instance the input is configured to provide the alternating current signal.

11. The apparatus as claimed in claim 1 wherein the two dimensional material or the three dimensional material comprises a conductive material.

12. The apparatus as claimed in claim 1, wherein the two dimensional material or the three dimensional material comprises at least one of: graphene, graphene oxide, reduced graphene oxide, functionalized graphene, molybdenum disulphide, tungsten disulphide, or boron nitride.

13. The apparatus as claimed in claim 1, wherein the parameter comprises at least one of; temperature, humidity, light, or analytes.

14. An electronic device comprising the apparatus as claimed in claim 1 and electronic circuitry configured to process the audio output signal and the electrical output signal.

15. The electronic device as claimed in claim 14 wherein the electronic circuitry is one of: provided within the apparatus; or provided outside of the apparatus.

16. The electronic device as claimed in claim 14 comprising a plurality of apparatus and one or more electronic circuitries configured to process the audio output signal and electrical output signal from the plurality of apparatus.

17. The electronic device as claimed in claim 16, wherein the one or more electronic circuitries are further configured to use the processed audio output signal and the electrical output signal to adaptively adjust one or more specifications of at least one of the plurality of apparatus.

18. An apparatus comprising a microphone arrangement, the microphone arrangement comprising: a microphone membrane configured to sense sound signals; and a sensing arrangement positioned within the microphone arrangement and comprising two dimensional material configured to sense a parameter; wherein the microphone membrane is further configured to transduce a sound signal into an audio output signal based on sensed sound signals and the sensing arrangement is further configured to transduce the parameter into an electrical output signal; further comprising at least one of: an input configured to enable a bias voltage to be provided to the microphone membrane; and an input configured to enable an alternating current signal to be provided to the two dimensional material; wherein the alternating current signal provides a carrier signal.

19. An electronic device comprising a microphone arrangement, the microphone arrangement comprising:
a microphone membrane configured to sense sound signals; and
a sensing arrangement positioned within the microphone arrangement and comprising two dimensional material configured to sense a parameter;
wherein the microphone membrane is further configured to transduce a sound signal into an audio output signal based on sensed sound signals and the sensing arrangement is further configured to transduce the parameter into an electrical output signal;
further comprising one or more microphone arrangements and one or more electronic circuitries configured to process the audio output signal and electrical output signal from the one or more microphone arrangements;
wherein the one or more electronic circuitries are further configured to use the processed audio output signal and the electrical output signal to adaptively adjust one or more specifications of at least one of the one or more microphone arrangements.

* * * * *